US012403828B2

(12) United States Patent
Pueblo

(10) Patent No.: US 12,403,828 B2
(45) Date of Patent: Sep. 2, 2025

(54) ADJUSTABLE VEHICULAR REARVIEW MIRROR DEVICE

(71) Applicant: John Pueblo, Bossier City, LA (US)

(72) Inventor: John Pueblo, Bossier City, LA (US)

(*) Notice: Subject to any disclaimer, the term of this patent is extended or adjusted under 35 U.S.C. 154(b) by 415 days.

(21) Appl. No.: 18/110,248

(22) Filed: Feb. 15, 2023

(65) Prior Publication Data
US 2024/0270163 A1    Aug. 15, 2024

(51) Int. Cl.
B60R 1/02    (2006.01)
B60R 1/04    (2006.01)

(52) U.S. Cl.
CPC ............. B60R 1/025 (2013.01); B60R 1/04 (2013.01)

(58) Field of Classification Search
CPC .... B60R 1/025; B60R 1/04; B60R 2001/1215
USPC ......................................................... 359/854
See application file for complete search history.

(56) References Cited

U.S. PATENT DOCUMENTS

| | | | |
|---|---|---|---|
| 1,969,415 A * | 8/1934 | Ostroff | B60R 1/081 248/277.1 |
| 2,214,639 A | 9/1940 | Lenta | |
| 2,979,989 A | 4/1961 | Calder, Jr. | |
| 3,145,257 A | 8/1964 | Suga | |
| 3,180,219 A * | 4/1965 | Ruiz | B60R 1/081 359/865 |
| 5,124,845 A * | 6/1992 | Shimojo | B60Q 1/2665 362/135 |
| 5,517,367 A | 5/1996 | Kim | |
| 5,579,133 A * | 11/1996 | Black | B60R 1/082 359/872 |
| 5,946,149 A * | 8/1999 | Hoffman | B60R 1/081 359/872 |
| 7,084,749 B1 * | 8/2006 | Honeck | B60C 23/04 340/447 |
| 2001/0003439 A1 * | 6/2001 | DeLine | B60R 1/12 340/815.4 |
| 2004/0090688 A1 | 5/2004 | Mostrom | |
| 2004/0184282 A1 * | 9/2004 | Nishijima | B60R 1/12 362/516 |
| 2005/0068647 A1 | 3/2005 | Brandt | |
| 2011/0299185 A1 * | 12/2011 | Rawlings | B60R 1/04 359/872 |
| 2013/0128333 A1 * | 5/2013 | Agrawal | B60R 1/12 359/267 |

* cited by examiner

Primary Examiner — Ricky D Shafer

(57) ABSTRACT

An adjustable vehicular rearview mirror device for adjusting the rearview mirror to view blind spots of a vehicle includes a housing having a back wall and a perimeter wall being coupled to and extending forward from the back wall. A mirror is coupled to a front edge of the perimeter wall. The mirror includes a center section, a first lateral section, and a second lateral section. The first and second lateral sections each are pivotable about a corresponding vertical axis. A pair of levers includes a first lever and a second lever. The first lever is actuated to pivotally adjust the first lateral section relative to the corresponding vertical axis and the second lever is actuated to pivotally adjust the second lateral section relative to the corresponding vertical axis. A mount is coupled to an exterior surface of the back wall and mounts to an interior of a vehicle.

7 Claims, 5 Drawing Sheets

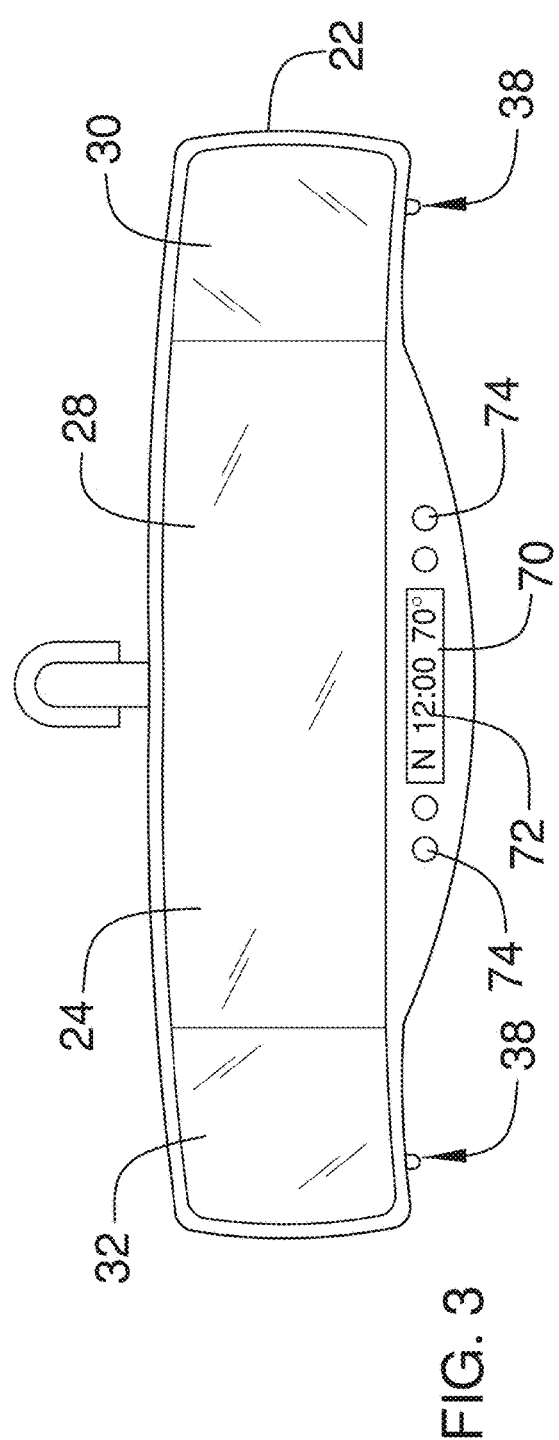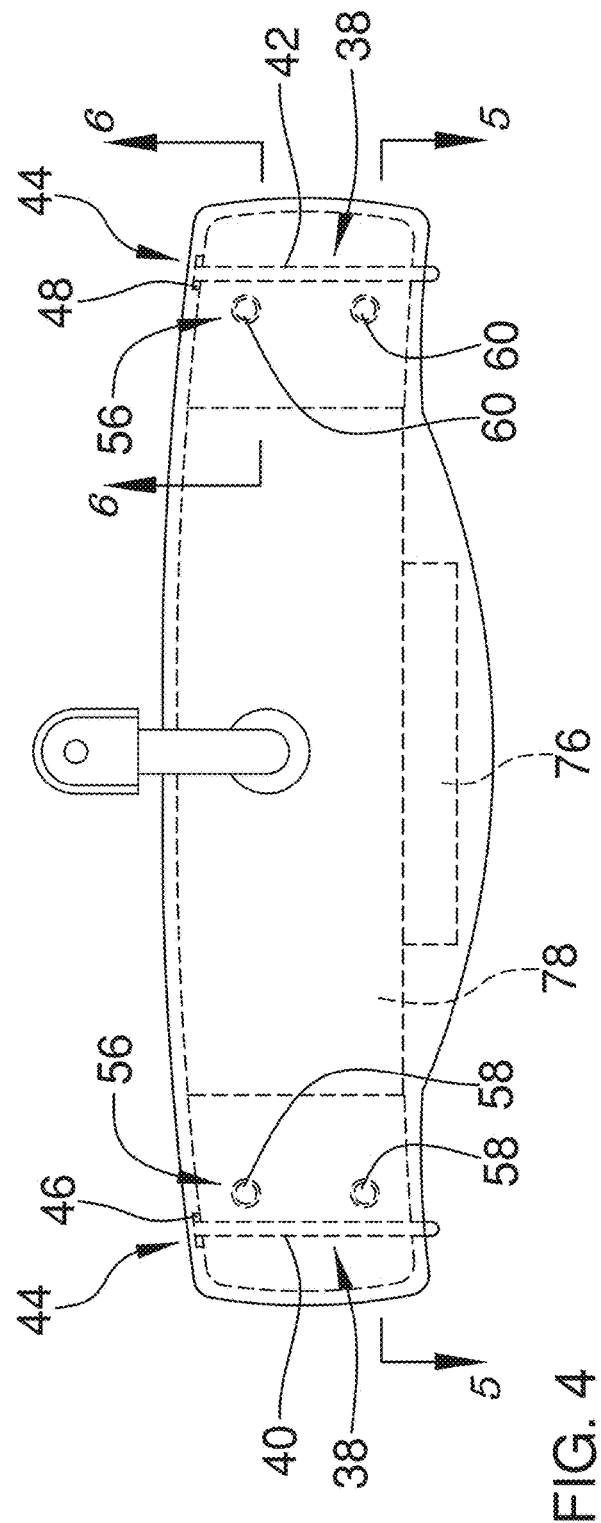

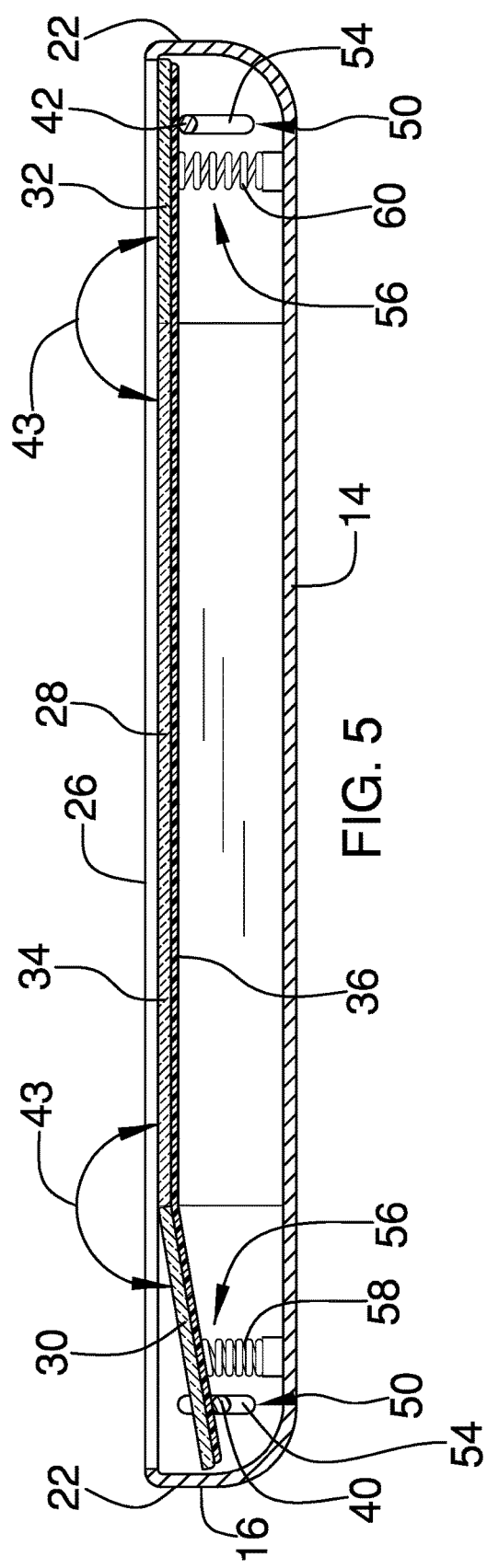
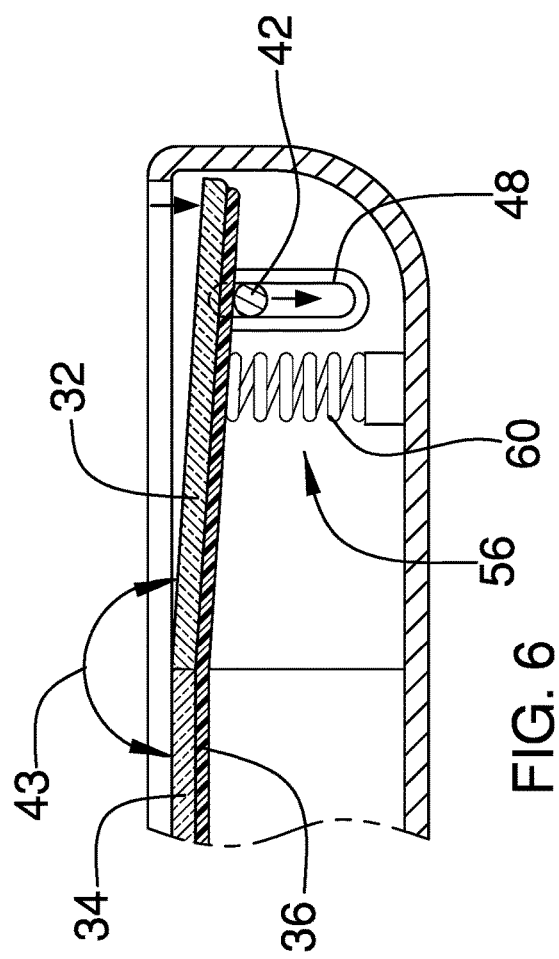

ADJUSTABLE VEHICULAR REARVIEW MIRROR DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to vehicle rearview mirrors and more particularly pertains to a new rearview mirror having adjustable sections of mirrors to facilitate the viewing of blindspots.

(2) Description of Related Art Including Information Disclosed Under 37 CFR 1.97 and 1.98

The prior art relates to rearview mirrors and includes a variety of rearview mirrors being adjustable to enhance viewing a rear of a vehicle. Known prior art does not include a rearview mirror having a pair of sections being adjustable and a middle section being fixed such that the rearview mirror does not create a convex shape forming a fisheye view.

BRIEF SUMMARY OF THE INVENTION

An embodiment of the disclosure meets the needs presented above by generally comprising a housing having a back wall being elongated and a perimeter wall being coupled to and extending forward from the back wall. The perimeter wall includes a top wall, a bottom wall, and a pair of side walls. A mirror is coupled to a front edge of the perimeter wall and is elongated. The mirror includes a center section, a first lateral section, and a second lateral section. The center section is fixed in the housing and the first and second lateral sections each are pivotable about a corresponding vertical axis. A pair of levers includes a first lever and a second lever. The first lever is coupled to the first lateral section and the second lever is coupled to the second lateral section of the mirror. The first lever is actuated to pivotally adjust the first lateral section relative to the corresponding vertical axis and the second lever is actuated to pivotally adjust the second lateral section relative to the corresponding vertical axis. A mount is coupled to an exterior surface of the back wall and is configured for mounting to an interior of a vehicle, wherein the mount mounts the housing to the interior of the vehicle. A display is coupled to the front edge of the perimeter wall and displays vehicular related indicia when actuated. An actuator is electrically coupled to the display and actuates the display when engaged by the user. A power supply is electrically coupled to the display and to the actuator.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a rear view of an embodiment of the disclosure.

FIG. 5 is a cross-sectional view of an embodiment of the disclosure taken along Line 5-5 of FIG. 4.

FIG. 6 is a partial cross-sectional view of an embodiment of the disclosure taken along Line 6-6 of FIG. 4.

DETAILED DESCRIPTION OF THE INVENTION

Figure 1:
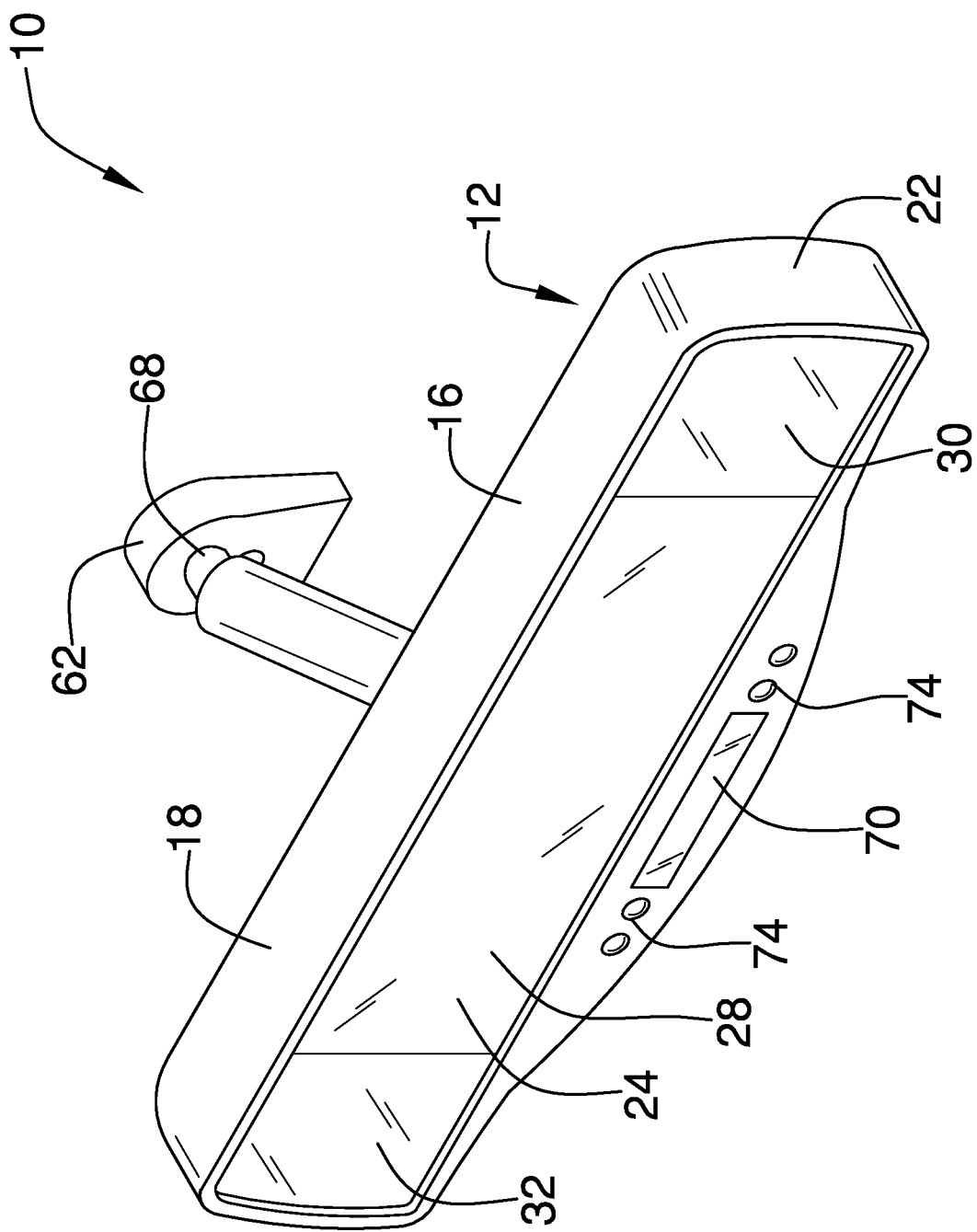
FIG. 1 is a front isometric view of an adjustable vehicular rearview mirror device according to an embodiment of the disclosure.
Figure 2:
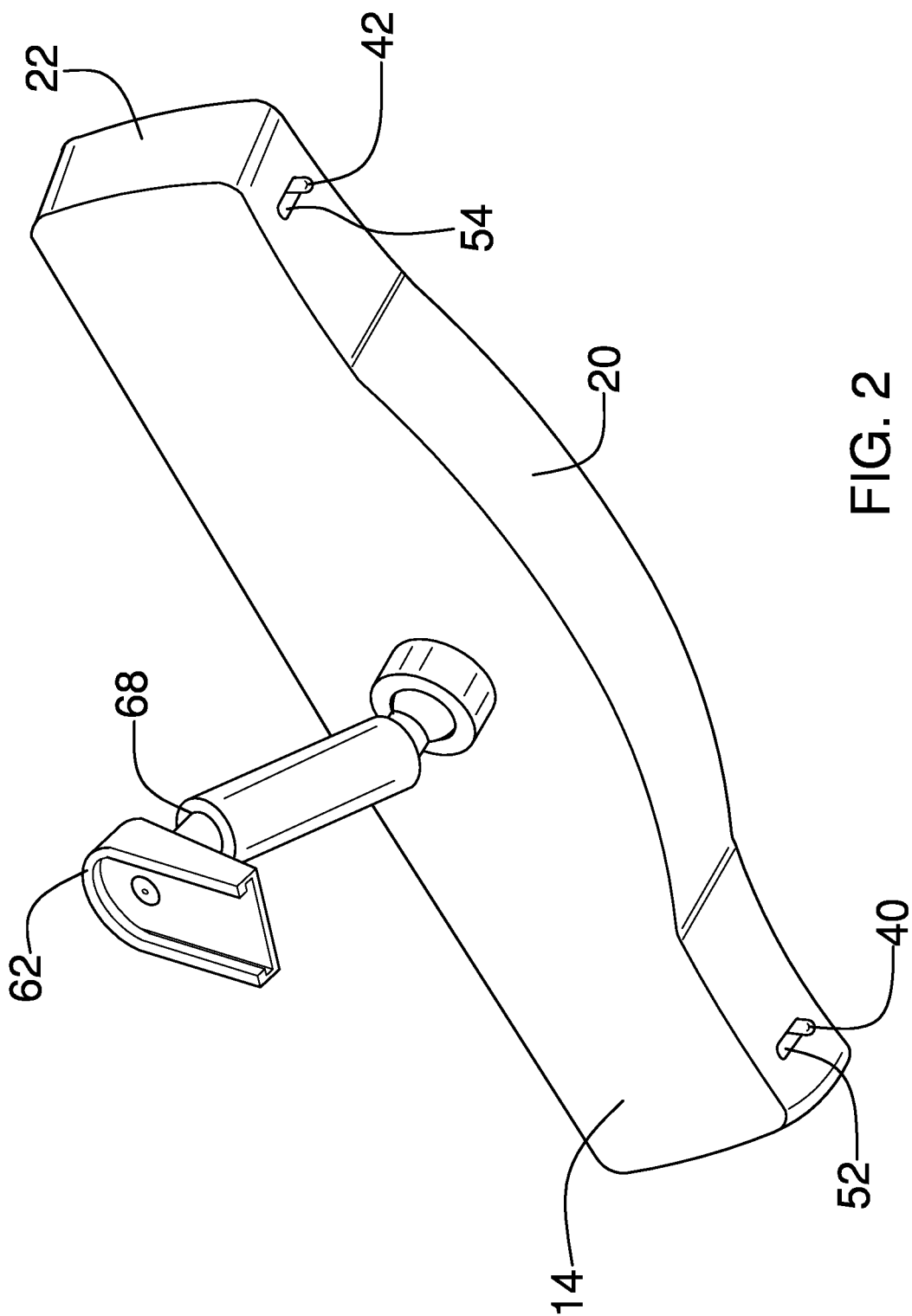
FIG. 2 is a rear isometric view of an embodiment of the disclosure.
Figure 7:
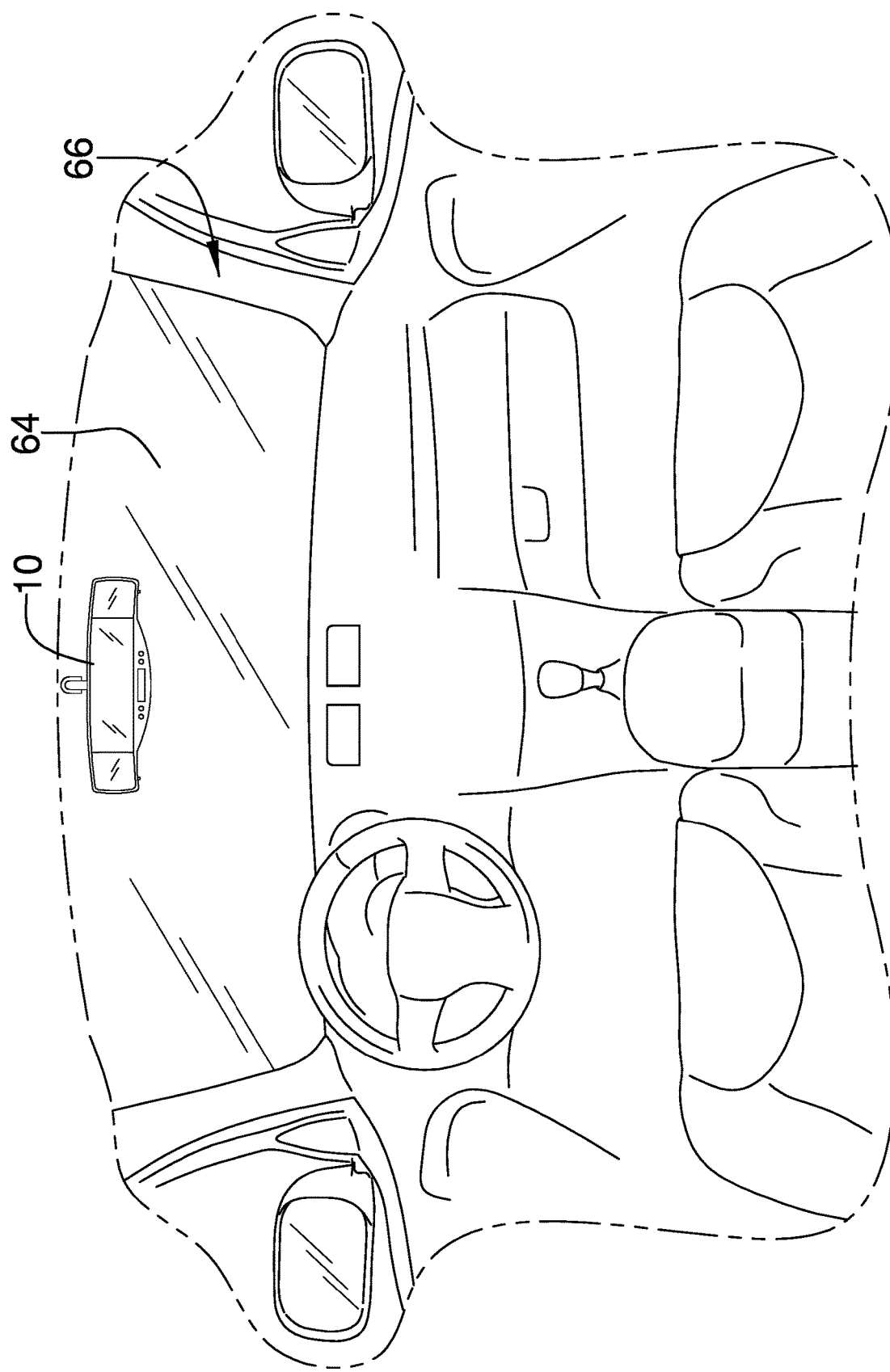
FIG. 7 is an in-use view of an embodiment of the disclosure.

With reference now to the drawings, and in particular to FIGS. 1 through 7 thereof, a new rearview mirror embodying the principles and concepts of an embodiment of the disclosure and generally designated by the reference numeral 10 will be described.

As best illustrated in FIGS. 1 through 7, the adjustable vehicular rearview mirror device 10 generally comprises a housing 12 having a back wall 14 being elongated and a perimeter wall 16 being coupled to and extending forward from the back wall 14. The perimeter wall 16 includes a top wall 18, a bottom wall 20, and a pair of side walls 22. A mirror 24 is coupled to a front edge 26 of the perimeter wall 16 and is elongated. The mirror 24 includes a center section 28, a first lateral section 30, and a second lateral section 32, wherein the center section 28 is positioned between the first 30 and second 32 later sections. As can be seen in the Figures, the mirror is comprised of forward side 34, which is a forward facing mirrored side, and a rear side 36 that is comprised of a flexible material. The center section 28 is separated from the first 30 and second 32 sections and the flexible material allows the first 30 and second 32 sections to move relative to the center section 28. This could also be achieved by hingedly coupling the first 30 and second 32 sections to the center section 28. The center section 28 is fixed in the housing 12 relative to the first 30 and second 32 lateral sections. The first 30 and second 32 sections are generally pivotable, relative to the center section 28, at vertical axes where the first 30 and second 32 sections abut the center section 28.

The adjustable vehicular rearview mirror device 10 includes a pair of levers 38 including a first lever 40 and a second lever 42. The first lever 40 is coupled to the first lateral section 30 and the second lever 42 is coupled to the second lateral section 32 of the mirror 24. The first lever 40 and the second lever 42 are actuated to adjust an angle in the forward sides of the first 30 and second 32 lateral sections relative to the center section 28. An angle 43 formed in the forward sides of the first 30 and second 32 lateral sections with respect to the central section may be adjusted from 180° up to 225°, wherein the 180° denotes a flat mirror between formed with a corresponding one of the first 30 and second 32 lateral sections with the central section 28. The center section 28 remains flat relative to the housing 12 such that the mirror 24 does not form a convex shape when the first 30 and second 32 lateral sections are adjusted so that the mirror 24 does not produce a fisheye view from forming the convex shape. However, it should be understood that entire mirror 24 may be pivotable within the housing 12 along a horizontal axis to utilize a dimmer feature 25 on the mirror 24 as is typical in conventional rearview mirror devices.

A pair of tracks 44 is positioned within the housing 12 and is mounted to the top wall 18 of the housing 12. A first track 46 of the pair of tracks 44 receives a top end of the first lever 40, wherein the first lever 40 is slidable within the first track 46. A second track 48 of the pair of tracks 44 receives an upper end of the second lever 42, wherein the second lever 42 is slidable within the second track 48. A pair of slots 50 is positioned on the bottom wall 20 of the housing 12 and extends therethrough. The pair of slots 50 includes a first slot 52 and a second slot 54. A bottom end of the first lever 40 is slidably positioned within the first slot 52 and a lower end of the second lever 42 is slidably positioned within the second slot 54. The user can actuate the first lever 40 by sliding the bottom end of the first lever 40 within the first slot 52 and the user can actuate the second lever 42 by sliding the lower end of the second lever 42 within the second slot 54.

A plurality of biasing members may be utilized within the housing 28 to bias the first 30 and second 32 sections back into a planar configuration with respect to the center section 28. The biasing members in one embodiment may include multiple springs 56. The plurality of springs 56 includes a first pair of springs 58 and a second pair of springs 60. The first pair of springs 58 is coupled to the first lateral section 30 and the second pair of springs 60 is coupled to the second lateral section 32 of the mirror 24. The first pair of springs 58 biases the first lateral section 30 to be positioned parallel with the center section 28 of the mirror 24 and the second pair of springs 60 biases the second lateral section 32 to be positioned parallel with the center section 28 of the mirror 24. Each spring 56 of the plurality of springs 56 is positioned within the housing 12 and is coupled to an interior surface of the back wall 14. The first pair of springs 58 is coupled to a back side of the first lateral section 30 and the second pair of springs 60 is coupled to a back side of the second lateral section 32.

A mount 62 is coupled to an exterior surface of the back wall 14 and is configured for mounting to an interior 64 of a vehicle 66, wherein the mount 62 mounts the housing 12 to the interior 64 of a vehicle 66. The mount 62 typically mounts proximate to a top edge of a front windshield of the vehicle 66 typically either to the windshield itself or to a roof of the vehicle adjacent to the windshield. The mount 62 may include a pivot 68 to adjust the housing 12 relative to the interior of the vehicle when the housing 12 is mounted to the interior 64 of the vehicle 66.

A display 70 may be coupled to the front edge 26 of the perimeter wall 16 and displays vehicular related indicia 72 when actuated. The vehicular related indicia 72 may include time, temperature readings, cardinal directions of a compass, or any other vehicular related indicia 72 configured to provide information to the user. The display 70 typically comprises an electronic screen. An actuator 74 is electrically coupled to the display 70 and actuates the display 70 when engaged by the user. The actuator 74 comprises at least one switch and typically will include a plurality of push buttons. A power supply 76 is electrically coupled to the display 70 and to the actuator 74. The power supply 76 may include at least one solar panel 78 mounted to the back wall 14. The power supply 76 may also comprise a battery being positioned within the housing 12. The battery may be rechargeable or replaceable. The power supply 76 may also be electrically coupled to a vehicle battery of the vehicle 66, wherein the power supply 76 receives electricity from the vehicle battery.

In use, the mount 62 mounts the housing 12 to the interior 64 of the vehicle 66. The first lever 40 of the pair of levers 38 can be actuated to adjust the first lateral section 30 of the mirror 24 to enhance viewing a first-side of a rear of the vehicle 66. The second lever 42 of the pair of levers 38 can be actuated to adjust the second lateral section 32 of the mirror 24 to enhance viewing a second-side of the rear of the vehicle 66. The center section 28 of the mirror 24 is fixed to view a center of the rear of the vehicle 66. The user may engage with the actuator 74 to actuate the display 70 to display vehicular related indicia 72.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adjustable rearview mirror device comprising:
a housing having a back wall being elongated and a perimeter wall being coupled to and extending forward from said back wall, said perimeter wall including a top wall, a bottom wall, and a pair of side walls;
a mirror being coupled to a front edge of said perimeter wall and being elongated, said mirror including a center section, a first lateral section, and a second lateral section, said center section being fixed in said housing, said first and second lateral sections each being pivotable relative to said center section;
a pair of levers including a first lever and a second lever, said first lever being coupled to said first lateral section of said mirror and said second lever being coupled to said second lateral section of said mirror, said first lever being actuated to pivotally adjust said first lateral section relative to said center section and said second lever being actuated to pivotally adjust said second lateral section relative to said center section;
a mount being coupled to an exterior surface of said back wall, said mount being configured for mounting to an interior of a vehicle, wherein said mount mounts said housing to the interior of the vehicle;
a display being coupled to said front edge of said perimeter wall and displaying vehicular related indicia when actuated;
an actuator being electrically coupled to said display and actuating said display when engaged by a user; and
a power supply being electrically coupled to said display and to said actuator.

2. The adjustable rearview mirror device of claim 1, further including a pair of tracks being positioned within said housing and being mounted to said top wall of said housing, a first track of said pair of tracks receiving a top end of said first lever, wherein said first lever being slidably positionable within said first track, a second track of said pair of tracks receiving a top end of said second lever, wherein said second lever being slidably positionable within said second track.

3. The adjustable rearview mirror device of claim 2, further including a plurality of biasing members to bias said first and second sections into a planar configuration with respect to said center section, said biasing members comprising a plurality of springs, each spring of said plurality of springs being positioned within said housing and being coupled to an interior surface of said back wall, said plurality of springs including a first pair of springs and a second pair of springs, said first pair of springs being coupled to said first lateral section and said second pair of springs being coupled to said second lateral section of said mirror, said first pair of springs biasing said first lateral section to be positioned parallel with said center section of said mirror and said second pair of springs biasing said second lateral section to be positioned parallel with said center section of said mirror, said first pair of springs being coupled to said back side of said first lateral section and said second pair of springs being coupled to said back side of said second lateral section.

4. The adjustable rearview mirror device of claim 1, wherein said display comprises an electronic screen.

5. The adjustable rearview mirror device of claim 4, wherein said actuator comprises at least one switch.

6. The adjustable rearview mirror device of claim 1, wherein said power supply includes at least one solar panel, at least one solar panel being mounted to said back wall.

7. An adjustable rearview mirror device comprising:
a housing having a back wall being elongated and a perimeter wall being coupled to and extending forward from said back wall, said perimeter wall including a top wall, a bottom wall, and a pair of side walls;
a mirror being coupled to a front edge of said perimeter wall and being elongated, said mirror including a center section, a first lateral section, and a second lateral section, said center section being positioned between said first and second lateral sections, said center section being fixed in said housing, said first and second lateral sections each being pivotable relative to said center section;
a pair of levers including a first lever and a second lever, said first lever being coupled to said first lateral section of said mirror and said second lever being coupled to said second lateral section of said mirror, said first lever being actuated to pivotally adjust said first lateral section relative to said center section and said second lever being actuated to pivotally adjust said second lateral section relative to said center section;
a pair of tracks being positioned within said housing and being mounted to said top wall of said housing, a first track of said pair of tracks receiving a top end of said first lever, wherein said first lever being slidably positionable within said first track, a second track of said pair of tracks receiving a top end of said second lever, wherein said second lever being slidably positionable within said second track;
a pair of slots being positioned on said bottom wall of said housing and extending therethrough, said pair of slots including a first slot and a second slot, a bottom end of said first lever being slidably positioned within said first slot and a bottom end of said second lever being slidably positioned within said second slot;
a plurality of biasing members to bias said first and second sections into a planar configuration with respect to said center section, said biasing members comprising a plurality of springs, each spring of said plurality of springs being positioned within said housing and being coupled to an interior surface of said back wall, said plurality of springs including a first pair of springs and a second pair of springs, said first pair of springs being coupled to said first lateral section and said second pair of springs being coupled to said second lateral section of said mirror, said first pair of springs biasing said first lateral section to be positioned parallel with said center section of said mirror and said second pair of springs biasing said second lateral section to be positioned parallel with said center section of said mirror, said first pair of springs being coupled to said back side of said first lateral section and said second pair of springs being coupled to said back side of said second lateral section;
a mount being coupled to an exterior surface of said back wall, said mount being configured for mounting to an interior of a vehicle, wherein said mount mounts said housing to the interior of the vehicle;
a display being coupled to said front edge of said perimeter wall and displaying vehicular related indicia when actuated, said display comprising an electronic screen;
an actuator being electrically coupled to said display and actuating said display when engaged by a user, said actuator comprising at least one switch; and a power supply being electrically coupled to said display and to said actuator, said power supply including at least one solar panel, at least one solar panel being mounted to said back wall.

\* \* \* \* \*